350-376 SR )SS REFERENCE SEARCH ROOM
XR 2,984,825

May 16, 1961 H. W. FULLER ET AL 2,984,825

MAGNETIC MATRIX STORAGE WITH BLOCH WALL SCANNING

Filed June 2, 1958 5 Sheets-Sheet 1

INVENTORS
HARRISON W. FULLER
HARVEY RUBINSTEIN
SIDNEY P. WOODSUM

BY Fred Jacob
ATTORNEY

2984825
OR IN 365/173

INVENTORS
HARRISON W. FULLER
HARVEY RUBINSTEIN
SIDNEY P. WOODSUM

BY Fred Jacob
ATTORNEY

May 16, 1961 H. W. FULLER ET AL 2,984,825

MAGNETIC MATRIX STORAGE WITH BLOCH WALL SCANNING

Filed June 2, 1958 5 Sheets-Sheet 3

INVENTORS
HARRISON W. FULLER
HARVEY RUBINSTEIN
SIDNEY P. WOODSUM

BY Fred Jacob
ATTORNEY

INVENTORS
HARRISON W. FULLER
HARVEY RUBINSTEIN
SIDNEY P. WOODSUM

BY Fred Jacob
ATTORNEY

*INVENTORS*
HARRISON W. FULLER
HARVEY RUBINSTEIN
SIDNEY P. WOODSUM

BY [signature]
*ATTORNEY*

United States Patent Office 2,984,825

Patented May 16, 1961

2,984,825

MAGNETIC MATRIX STORAGE WITH BLOCH WALL SCANNING

Harrison W. Fuller, Needham Heights, Harvey Rubinstein, Lynnfield Center, and Sidney P. Woodsum, Groton, Mass., assignors to Laboratory For Electronics, Inc., Boston, Mass., a corporation of Delaware Filed June 2, 1958, Ser No. 739,128

15 Claims. (Cl. 340—174)

The present invention relates in general to new and improved techniques for processing data to obtain matrix type data storage at high density and means for implementing these methods, and represents an extension of the principles underlying the inventions described in a copending application by Harrison W. Fuller, Serial No. 697,058, filed November 18, 1957.

Present day large capacity data storage systems generally employ magnetic storage devices in the form of tapes, drums and disks, data usually being stored on the surfaces thereof. The data is recorded sequentially so that scanning time is involved in any data retrieval. Scanning is normally accomplished by mechanical motion. In the most advanced present day systems, a data storage density of 1000 to 1500 binary digits per inch is possible, minimum access time being of the order of 300 milliseconds.

Present day matrix type storage systems frequently employ a magnetic core matrix in which each core is threaded by a number of conductors. The appearance of signals on a predetermined number of the conductors threading a core affects the magnetic state of the latter, such changed magnetic state being indicative of the stored data. Readout occurs in a similar manner, the signal corresponding to the data stored in a core appearing on the wires threading the latter. More advanced techniques employ a medium of ferroelectric material, sometimes in the form of a thin plate having a preferred direction of polarization, with the electrostatic field being applied to a matrix array of regions on the plate in order to affect their polarization. Another technique employs a matrix of thin film spots, each spot having an easy direction of magnetization. The magnetic field associated with respective conducting wires is applied and changes the magnetic state of the spots, such change being indicative of the data stored.

Each one of the prior art matrix type storage systems relies on the switching of discrete spots, thereby placing a lower limit in practice on the size of a single storage cell, i.e. on the oriented area wherein a portion of the data is stored. As a result, the storage density in bits per square inch of a given matrix surface is limited. Additionally, such storage devices require complex, bulky selection circuitry resulting in higher costs per bit and a lower volume efficiency.

As is well known, the selection costs of bit cells for linear and matrix arrays may be drastically reduced by sequentially reading bit cells by time scanning, the selection cost of a delay line being a good illustration thereof. It requires, however, the utilization of radically different techniques than those employed in conventional apparatus in order to obtain a storage density materially in excess of that which is presently possible.

Accordingly, it is a primary object of this invention to provide new and improved data processing techniques.

It is another object of this invention to provide techniques for processing data wherein the magnetic field associated with two or more walls separating oppositely oriented domains is utilized to divide a data storage medium selectively into an ordered arrangement of magnetized areas representative of the data.

It is a further object of this invention to provide a matrix type storage system wherein the joint effect of the magnetic fields associated with inter-domain walls existing in separate scanning media is used to orient discrete areas of a storage medium.

It is an additional object of this invention to provide a matrix type storage system wherein a configuration composed of discrete oriented areas of a storage medium is displayed in a visual manner, or in an optical manner.

In applying the techniques which form the subject matter of the present invention, a data storage medium is positioned in close association with two scanning media. Each scanning medium has its own predetermined easy direction of magnetization and follows a substantially square hysteresis characteristic in response to a magnetic field applied in this direction. In accordance with the most advanced available theories, the electron spin axes of the scanning medium are substantially parallel to an axis of preferred alignment in such a situation. The tendency of the electron spin axes is to remain aligned, i.e. to remain parallel to the preferred axis. This is true even though the spin axis orientation, i.e. the relative North and South poles of respective electron spin axes, may be opposed. Each distinct domain of the scanning medium consists of an area of like-oriented electron spin axes and is separated from an adjacent, oppositely oriented domain by an inter-domain wall which constitutes the transition between oppositely oriented domains. In the present invention, these inter-domain walls are established in each scanning medium and are made to traverse a given dimension thereof, respective ones of said dimensions being disposed at right angles to each other. The concentrated magnetic fields associated with respective traversing inter-domain walls cross and reinforce each other in a limited area such that the joint effect results in a scanning probe adapted to scan the storage medium which is positioned within the effective range thereof. The effectiveness of such a scan may be variously controlled by modulating the scanning velocity, by selectively opposing the scanning field or by a combination of both, to produce static magnetized areas in the storage medium in accordance with the data to be stored.

Data readout may proceed by scanning the storage medium with the aforesaid scanning probe. The existence of static magnetized areas in the storage medium slows down the traversing scanning probe and, hence, these areas can be detected by sensing velocity changes. Alternatively, the magneto-optic effect may be employed for the visual observation of the aforesaid areas.

These techniques make possible a data storage density greatly in excess of that heretofore possible on surface areas of comparable size, one theoretical upper limit being imposed by the thickness of the inter-domain walls.

These and other novel features of the invention together with further objects and advantages thereof will become more apparent from the following detailed specification with reference to the accompanying drawings, in which.

Figure 10:
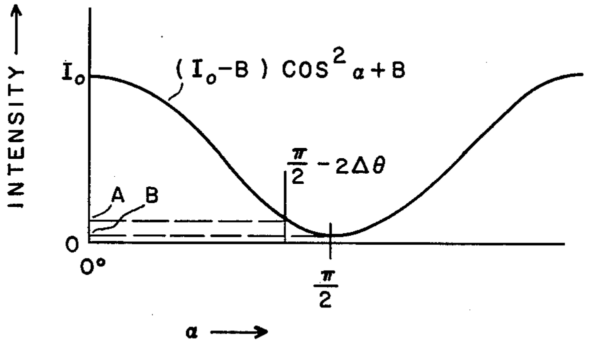
Figure 11:
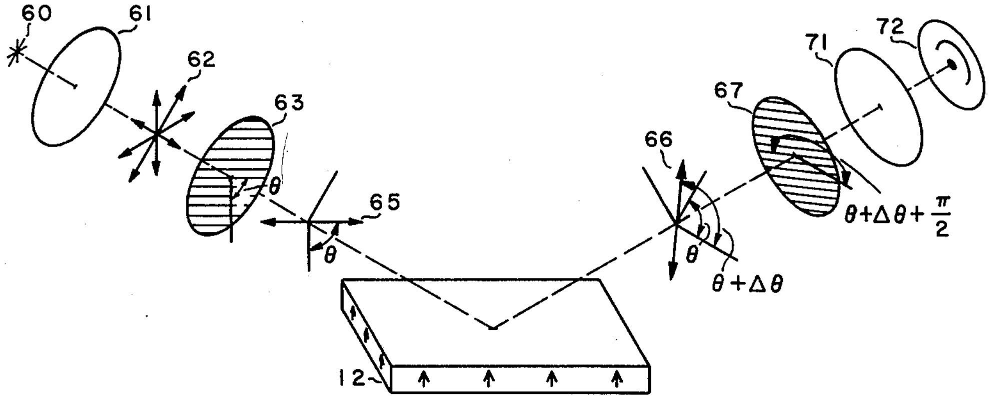

Fig. 10 graphically illustrates some of the physical constants which control the application of the magneto-optic effect in data readout; and Fig. 11 illustrates another embodiment of apparatus for optically reading out stored data, or for visual observation.

The description and the use of inter-domain walls is probably simplest to explain in the case of a thin film of ferromagnetic material which may be between 100 A. and 10,000 A. in thickness. Thin films of ferromagnetic material, typically Fe, Ni, Co, MnBi or alloys thereof which have been correctly treated to obtain an easy direction of magnetization, i.e. to align the electron spin axes substantially parallel to an axis of preferred alignment, are capable of being magnetized to saturation along the aforesaid easy direction to form a single magnetic domain. Theoretically, in such a domain all the elementary magnets of the film, i.e. all the electron spin axes, are oriented substantially alike. If the magnetizing field is reversed and the field is sufficiently strong, it is possible to reverse the orientation of the entire domain rapidly by domain rotation. In such a case, the elementary magnets reverse their direction by 180° substantially simultaneously. This property of rapid switching, which is of the order of $10^{-9}$ seconds, together with the substantially square B—H characteristic of oriented thin films, is of particular importance in the application of these films to magnetic cores and core matrices, both well known in the prior art. See Journal of Applied Physics 26, p. 975, 1955.

If the reversing field is of an intermediate strength, i.e. somewhat larger than the coercive force $H_c$ which is required to reverse the magnetization, the domain reversal proceeds more slowly by the mechanism of wall motion. In the latter process, reversal of the elementary electron spin moments of the film begins at one or more nuclei and spreads over the area of the film. During this process the film consists of domains which are saturated to magnetization in opposite directions, the domain boundaries comprising the aforementioned inter-domain walls or Bloch walls as they are commonly referred to. Provided the aligned electron spin axes were initially in the plane of the film, they are caused to rotate out of this plane in the region of the inter-domain wall field. Thus, centrally of the finite wall thickness the spin axes are perpendicular to the plane of the film, while on either side they conform to the mutually opposite orientation of respective bordering domains. Accordingly, intermediate the two sides of the wall the electron spin axes assume every transitional position required to execute a 180° reversal. In certain typical ferromagnetic materials of the kind referred to above, this transition occurs over a distance of about 100 lattice cells which is typically of the order of 1000 A. Inter-domain walls can be formed at one edge of the thin film and can be made to progress across the film in a controlled fashion. They have been observed in a number of ways including the method of Bitter (H. J. Williams and R. C. Sherwood, Magnetic Domain Patterns on Thin Films, Jour. Appl. Physics 28, 548, 1957), in which a colloidal suspension of magnetic particles on the surface of the film results in the agglomeration of these particles in the strong normal field associated with the wall. Another method has employed the well known magneto-optic effect, as described in Phys. Rev., vol. 100, p. 746, 1955.

The application of moving inter-domain walls as a scanning probe depends on the ability to form and propagate a single wall or a spatially restricted concentration of walls in a controlled way across a film of material. The Bloch wall qualifies for this application by nature of its small spatial extension in the direction of motion, by the absence of dispersion in the course of its motion, by its controllable velocity of motion, and by its high volume efficiency since no magnetic head is required. Other practical advantages include the ability to use the concentrated external magnetic field of the wall itself for both reading and writing operations, the static, non-volatile, non-destructively readable and erasable potentialities and finally the low cost of preparation.

Figure 1:
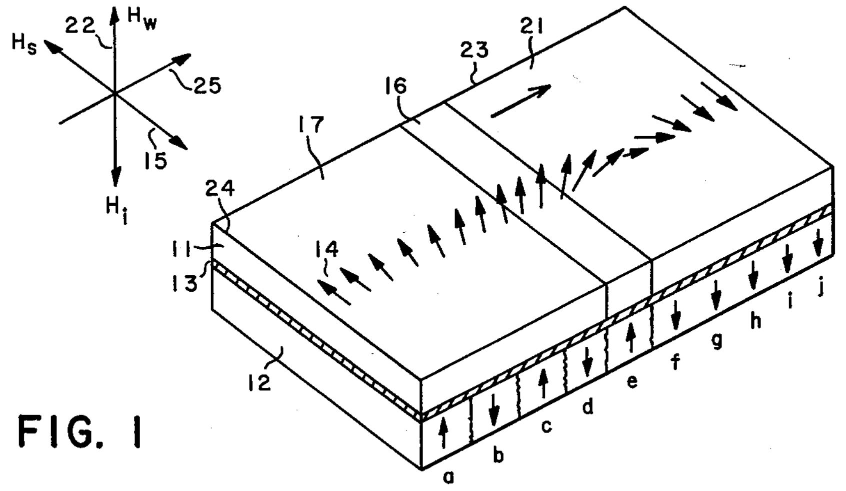
Fig. 1 illustrates one form of apparatus which uses controlled wall motion and which is useful to illustrate the underlying principles of the invention.

With reference now to the drawings and particularly Fig. 1 thereof, one form of apparatus is shown therein which illustrates the underlying principles of the invention. A thin-film scanning medium 11 is separated from a thin-film storage medium 12 by a film of insulation 13. A substrate, e.g. glass, which forms a rigid base for the media is omitted from this drawing for the sake of clarity. If atomic diffusion can be avoided when there is direct contact between the two media the insulation film may be omitted. When the latter is used, it consists of a non-magnetic, non-conductive material whose thickness is small enough to permit the positioning of the storage medium within the effective range of the magnetic scanning field which is associated with the traversing inter-domain walls of the scanning medium. Accordingly, the dimensions shown in Fig. 1 are not intended to be representative of the true dimensions, the thickness of the insulation film being approximately of the same order as that of the media. A material which may be used for the insulation film is SiO, since it can be applied in a special manner discussed hereinbelow. The media consist typically of one of the aforementioned metals Fe, Ni, Co, MnBi or alloys of these, such that the switching or reversal time of the storage medium, i.e. the time required to reorient one electron spin axis by 180° as described above, is large compared to that of the scanning medium. The material of the storage medium permits it to support many long, narrow, closely spaced, static domains and hence its coercive force $H_c$ is relatively high. Predetermined non-uniformities as well as impurities may also be provided in the storage medium in order to retain the aforesaid static domains. The easy direction of magnetization of the scanning medium is indicated by electron spin axes 14 which are shown to be substantially parallel to a preferred axis of alignment 15, the latter being illustrated in the vector diagram which forms part of Fig. 1. An inter-domain wall 16 divides the scanning medium into two separate domains 17 and 21, having substantially oppositely oriented electron spin axes. The electron spin axis orientation of the transitional area which comprises the aforesaid inter-domain wall 16, is seen to be substantially at right angles to the plane of scanning medium 11, such that the field vector $H_w$ of the magnetic scanning field is parallel to axis 22. A switching field $H_s$ which has a time-varying magnitude is applied in the direction shown and may have a uniform field gradient along a given dimension of the scanning medium. In the embodiment of Fig. 1 this dimension is defined by edge 23. As a result, an inter-domain wall is established at edge 24 which traverses the storage medium along the given dimension in the direction of vector 25 while the associated scanning field scans a corresponding dimension of the storage medium.

In lieu of applying a gradient switching field, a time-varying field which is uniform along the dimension defined by edge 23 may be applied while scanning medium 11 has a uniformly tapering thickness along this dimension. If the thinnest portion of the scanning medium is at edge 24, the effect of the switching field is strongest at this edge and the inter-domain wall is established there. The electron spin axes of the storage medium shown in the embodiment of Fig. 1 are substantially parallel to an axis of preferred alignment 22 which indicates the easy direction of magnetization. Since the scanning field $H_W$ is parallel to this axis, it is capable of reorienting the electron spin axes of a narrow region of the storage medium in accordance with its own vector direction. In the case illustrated in Fig. 1, the latter direction is at right angles to the plane of the storage medium and upward.

The method of storing data in the apparatus of Fig. 1 consists essentially of dividing the storage medium into static domains separated by static inter-domain walls, where each domain is representative of a portion of the data to be stored. This is carried out by selectively applying the $H_s$ field to establish an inter-domain wall at edge 24 of the scanning medium, and causing the wall to traverse the aforesaid given dimension of the medium. The effect of the scanning field is to reverse the orientation of the electron spin axes of the storage medium, i.e. to bring about progressively the uniform perpendicular magnetization of the latter as the scanning field scans a corresponding dimension of the storage medium. Data is written by applying an inhibiting field $H_I$ which opposes the scanning field such that the resultant field $H_W—H_I$ is too small to exceed the coercive force of the square loop storage medium. The application of $H_I$ signals occurs in a time sequence in accordance with the data to be stored, each such application causing an area of the storage medium to retain its orientation. Each of these areas depends in extent upon the distance the inter-domain wall traveled during the time interval when the inhibiting field was applied. Thus, if it be assumed that the initial electron spin axis orientation throughout the entire storage medium was as shown in positions *f* through *j*, i.e. opposite to the direction of the $H_W$ field, it will be seen that the action of $H_W$ to reorient these spin axes was inhibited in positions *b* and *d*, while reorientation took place in positions *a*, *c* and *e*. Thus, the scanning action to the extent illustrated in Fig. 1, produced five static oppositely oriented domains separated by static inter-domain walls, while the positions defined by letters *f* through *j*, as yet unscanned and all oriented in the same direction, still constitute a single domain. It will be evident that data significance may be assigned to each domain so created. For example, the orientation of each domain may be representative of a binary One or a binary Zero. In this connection it should be noted that, where the effect of the scan is the same in two or more successive positions, the resultant area actually forms a single domain. By means of a self-clocked readout, e.g. of the kind described in a copending application to Harrison W. Fuller et al., Serial No. 505,894, filed May 4, 1955, it is possible to determine the existence of adjacent like-oriented areas.

The energy obtained upon data readout from a single domain may be too small to produce a usable signal-to-noise ratio. A sequence of oppositely oriented domains may be used for each bit cell, where the particular order of the domains is representative of the binary digit. It should be noted that self-clocked readout is also applicable here.

The latter readout method is dependent upon spatially stabilized bit cells. To provide this condition the double pulse RZ (return to zero) method of recording may be used, as described in the above cited copending application. For example, an unreversed region may precede a reversed region of magnetization to represent a binary Zero, while following the reversed region for a binary One. Such sequences are again recorded by the selective use of the inhibiting field.

In general, once the entire scanning medium assumes the spin axis orientation of domain 17, a new wall can be produced only by reorienting the spin axes in the direction presently assumed by domain 23. In order to bring this about the direction of the switching field $H_s$ must be reversed. The occurrence of an erasing scan always calls for a scanning field which is reversed in direction from that of the previously occurring recording scan. Similarly, every recording scan must have a scanning field of opposite direction to that of the last occurring erasing scan. Since the direction of spin axis rotation determines the direction of the $H_W$ vector of the traversing inter-domain wall, it is important under these conditions that successive spin axis rotations of the scanning medium occur in the same direction. Thus, unless the clockwise rotation of the electron spin axes, indicated as occurring between domains 17 and 21, is continued, the next-occurring inter-domain wall, which will reorient domain 17 to the spin axis orientation of domain 21, will have an $H_W$ vector in the same direction as the one shown in connection with wall 16 of Fig. 1. Such a wall could not erase, i.e. reorient the electron spin axes of the storage medium to bring about the initial orientation as shown at positions *f* through *j*. For this reason a small quadrature field which is parallel to axis 22 is employed to assure successive spin axis rotations in the same direction. In the case of Fig. 1, the quadrature field is applied at edge 24, in opposition to $H_I$. Partial erasing, i.e. the uniform perpendicular magnetization of only a portion of the storage medium may be achieved by applying an erasing scan and opposing its scanning field during a portion of its travel by its application of an inhibiting field.

The data readout operation is carried out by scanning the storage medium while an oppositely directed inhibiting field is maintained in order to prevent any erasing from taking place. The resultant field which then scans the storage medium produces voltage variations in an appropriate sensing winding upon being velocity modulated by the magnetic fields associated with the static inter-domain walls of the storage medium. These voltage variations are detected and are indicative of the presence of respective domains and, hence, of the stored data. In an alternative readout method, no inhibiting field is used and the applied switching field causes the wall to propagate at a rate too large to affect the magnetized areas. As above, the irregular velocity pattern of the traversing wall, which is due to the existence of local fields, is observed by the voltage variations in the sensing winding.

The above methods of detecting oppositely oriented domains can be compared to the well known Barkhausen effect which occurs naturally in ferromagnetic materials. The imperfections which cause velocity modulation of the moving inter-domain walls in this case are represented above by the fields of the data-bearing domains of the storage medium.

Figure 2:
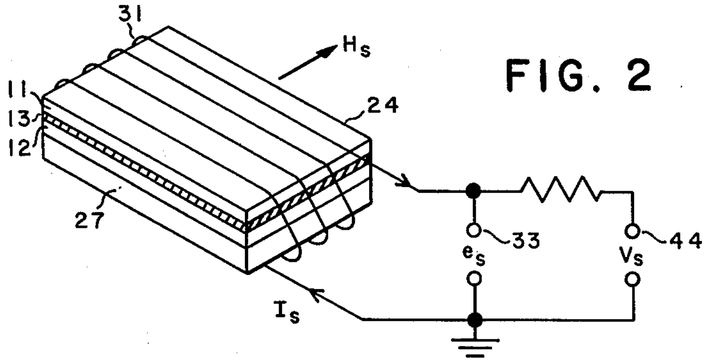
Fig. 2 illustrates means for applying a switching field to the apparatus of Fig. 1.

Fig. 2 illustrates apparatus for implementing the operation discussed above in connection with the "sandwich"-type apparatus shown in Fig. 1, applicable reference numerals having been carried forward. A substrate 27, which may be glass, is located under storage medium 12 and lends support to the entire structure. A source $V_s$ applies a slowly increasing voltage to end an increasing current $I_s$ through field coil 31 which is wound about the sandwich. Due to the graded thickness of the scanning medium, the effect of the resultant switching field $H_s$ is to produce an interdomain wall at the thinnest portion of the scanning medium. The increasing switching field then moves the wall by overcoming the coercive force of the progressively thicker sections of the scanning medium. Terminals 33 are conveniently located to measure a voltage $e_s$ during readout, which is indicative of the presence of distinct domains, as described above.

Figure 3:
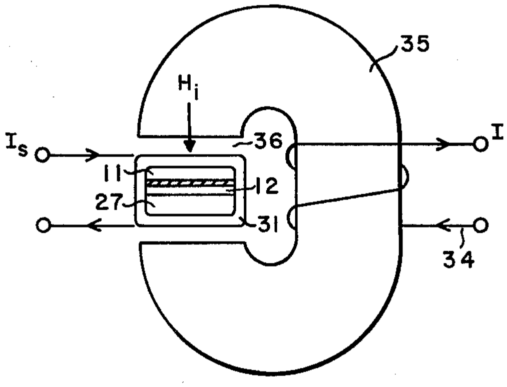
Fig. 3 illustrates means for applying an inhibiting field to the apparatus of Fig. 2.

Fig. 3 illustrates apparatus for applying the inhibiting field $H_I$. A current $I_I$ is applied to a field coil 34 which is wound around a core 35. The latter has an air gap 36 large enough to contain the "sandwich." The field $H_I$ which exists in the air gap is applied to the entire scanning medium and is at right angles to the plane of the sandwich. The direction of current $I_I$ determines the proper field direction in opposition to $H_W$.

Figure 4:
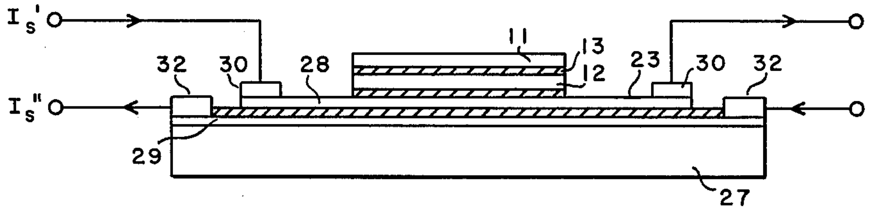
Fig. 4 illustrates another technique for applying a switching field to the apparatus of Fig. 1.
Figure 5:
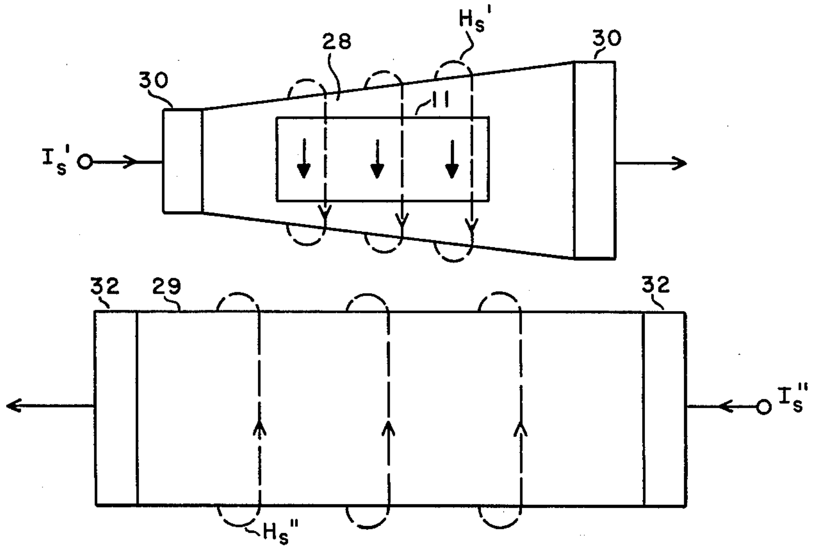
Fig. 5 is a detail view of Fig. 4.
Figure 6:
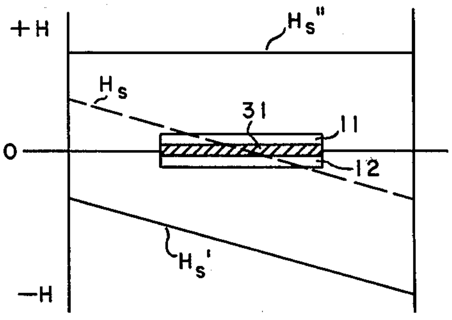
Fig. 6 illustrates in schematic form the component switching fields applied to the apparatus of Fig. 4.

Apparatus for obtaining a switching field gradient is illustrated in Figs. 4, 5 and 6, applicable reference numerals again being retained. Substrate 27 supports two conductive, nonmagnetic films 28 and 29 which may consist of silver and which are separated from each by a film of insulation. Another insulation film separates the ferromagnetic film of storage medium 12 from conductive film 28. The latter in turn is succeeded by insulation film 13 and by the ferromagnetic film of scanning medium 11. As may best be seen from Fig. 5, a current $I_s''$ is applied from a conductor to a thick block 32 which serves the function of presenting a uniform distribution of current to conductive film 29. The current flow creates a magnetic field $H_s''$ which surrounds the plane of film 29. The field is uniform close to the film surface and is normal to the direction of current flow. As will be apparent from Fig. 6, this $H_s''$ field is also uniform along the path of current flow in the film. Since the scanning medium is positioned within the effective range of this field, a uniform $H_s''$ field is applied along the dimension of wall traversal. In a preferred embodiment film 29 overlaps every edge of the "sandwich" in order to prevent end effects due to its magnetic field. Where the latter are sufficiently small, all the films of the embodiment of Fig. 4 may cover the same area. A current $I_s'$ is applied to block 30 which presents a uniform current distribution to film 28. The latter is tapered in width and similarly overlaps every edge of the "sandwich." The field $H_s'$ which is due to the $I_s'$ current, differs from the $H_s''$ field by being of opposite direction in the vicinity of the scanning medium and having a field gradient along the dimension of wall traversal. The resultant switching field $H_s$ which is applied to the scanning medium, creates a region 31 intermediate strong positive and negative fields where the magnetic field strength is less than the coercive force of the medium. It has been determined that such a region requires the existence of an interdomain wall and hence, passing region 31 across the scanning medium will determine the origin as well as the traversal of the wall. By increasing the magnitude of $I_s''$ in time, the resultant $H_s$ will vary such that the aforesaid region traverses the scanning medium and thereby controls the motion of the inter-domain wall. It will be evident that numerous structural variations are possible for obtaining the same result. For example, positioning the "sandwich" intermediate two conductive films, which are connected together along one edge, permits the use of a single current source. Still further refinements are possible by using a third conductive film.

Regardless of the number of conductive films used for each "sandwich," or their position relative to the "sandwich," successive "sandwiches" with their associated conductive and insulation films can be built up by using a single substrate as a base, current connections to respective conductive films being made along the edges. Each film may be applied by a process of vacuum deposition, appropriate magnetic orienting fields being applied during the deposition of respective scanning and storage media in order to obtain the desired easy directions of magnetization. Except in the case where the scanning medium is to be graded in thickness, all films are applied with a uniform thickness. Depending on the requirements of each case, the latter may vary from 100 A. to 10,000 A. Blocks 30 and 32 are conductively affixed to respective conductive films either by the deposition process or after the latter is completed and conductive leads are attached to the blocks. The area of the "sandwich" itself will depend on the particular situation, but may be limited by the dimension which the inter-domain wall can traverse reliably. Thus, an excessive tendency of the wall to curve during its traversal of the scanning medium may be undesirable when it impairs the reliability of the scan. Since such curvature is sometimes aggravated by an excessively long traversal, there may be a limitation on the area of the scanning medium. It should be noted, however, that wall curvature is not damaging under all conditions, provided it is reproducible on successive scans.

One method of inhibiting the curvature of the inter-domain walls is to provide straight line discontinuities in the storage medium normal to the direction of travel of the scanning field. These may, for example, take the form of grooves at intervals equivalent to the expected storage density, which may be produced during the vacuum deposition process. Alternatively, deposition of the storage medium can be performed on a diffraction grating replica. Final polishing of the high spots produces true discontinuities, and the uniform insulation as well as the scanning medium are deposited thereon. The advanced sections of the curved traversing wall will then be delayed sufficiently at each discontinuity to enable the lagging section to catch up. Since the average wall velocity may be properly controlled, these regularly spaced discontinuities produce periodic variations in the applied switching voltage. These variations may be sensed during the data writing process to furnish an external clock.

In order to obtain reliable data readout, it is important that the storage medium retain its static inter-domain walls in the same position where they were formed during the data storage process. The use of a high coercive force material for the storage medium may not alone be sufficiently reliable to accomplish this in the presence of external fields. To this end, finely divided impurities may be deposited together with the material of the storage medium, which will aid in trapping the walls to keep them stationary. Alternatively, the storage medium may be applied through a finely divided screen which creates minute discontinuities between metallized spots.

It will be remembered, on the other hand, that freely movable walls are desired in the scanning medium and hence a low coercive force material is used. Care must be taken to shield the scanning medium from the effects of external fields, including the earth's magnetic field.

In the above-described data processing technique, velocity modulation of the traversing inter-domain wall may be substituted for the use of the inhibiting field in order to control the effectiveness of the scanning field during storage as well as during readout. In this method, the inter-domain wall normally traverses the scanning medium at a velocity too great for the associated magnetic scanning field $H_w$ to have any effect on the storage medium. Data is written at the desired positions of the storage medium by decreasing the velocity of motion of the inter-domain wall. This permits the $H_w$ field to reorient the affected area of the storage medium. Taking the embodiment of Figs. 5 and 6 as an example, a binary One is written by opposing the time-varying switching current $I_s''$ such that its rate of increase is temporarily slowed down. As a result, region 31 travels across the scanning medium at a lower velocity and causes the scanning field to linger long enough to reverse the perpendicular magnetization of the storage medium. Thereafter, the original velocity of the wall is resumed. In the case described, binary Zeros are represented by the non-reversal of the perpendicular magnetization of the storage medium. In order for this method to be successful, the scanning medium should have a small reversal time relative to that of the storage medium.

Figure 7:
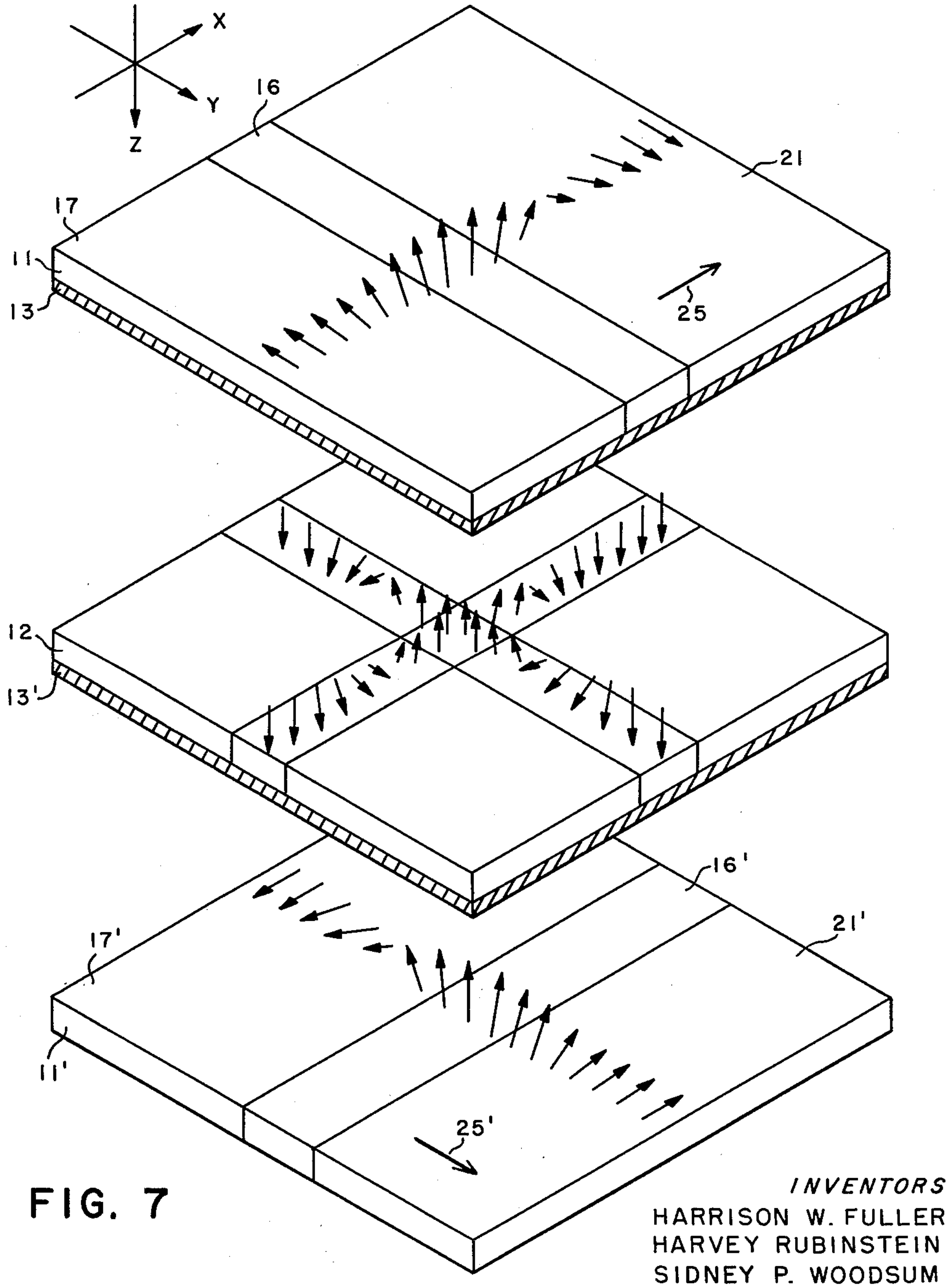
Fig. 7 illustrates one embodiment of a matrix type storage device which forms the invention herein.

Fig. 7 illustrates an exploded view of one embodiment of a matrix type storage device which constitutes the subject matter of the invention herein and which utilizes the principles illustrated in connection with the apparatus of Figs. 1–6. Wherever possible, applicable reference numerals have been carried forward. A storage medium 12 is interposed between scanning media 11 and 11' respectively, insulation films 13 and 13' separating respective media from each other. The easy direction of magnetization of scanning medium 11 is parallel to the Y-axis, while that of scanning medium 11' is parallel to the X-axis. The application of a first switching field to scanning medium 11 in the direction of the Y-axis establishes an inter-domain wall 16 at one edge thereof, movement of the latter in the direction indicated by arrow 25 being controllable. Similarly, the application of a switching field to scanning medium 11′ in the direction of the X-axis, establishes an inter-domain wall 16′, movement of the latter in the direction indicated by arrow 25′ being controllable. As explained in connection with Fig. 1, each inter-domain wall so produced has a concentrated magnetic field associated therewith. The media are so arranged relative to each other that respective associated fields are parallel to the Z-axis and in the same direction. Storage medium 12 has an easy direction of magnetization which is parallel to the Z-axis. The spacing of respective scanning media from the high coercive force storage medium is sufficiently large due to the thickness of insulating films 13 and 13′ respectively, that the application to the storage medium of the field associated with a single wall only, is insufficient to reorient the electron spin axes of the storage medium. However, since the scanning fields associated with respective inter-domain walls 16 and 16′ reinforce each other where they cross and coincide, the resultant scanning probe applied to the storage medium is large enough to bring about the reorientation of the electron spin axes of the affected area. In the manner described in connection with Figs. 1–6, an inhibiting field parallel to the Z-axis is necessary to prevent writing in unselected areas or, alternatively, velocity modulation of at least one of the walls is required. With this arrangement, data storage in matrix form is possible.

Figure 8:
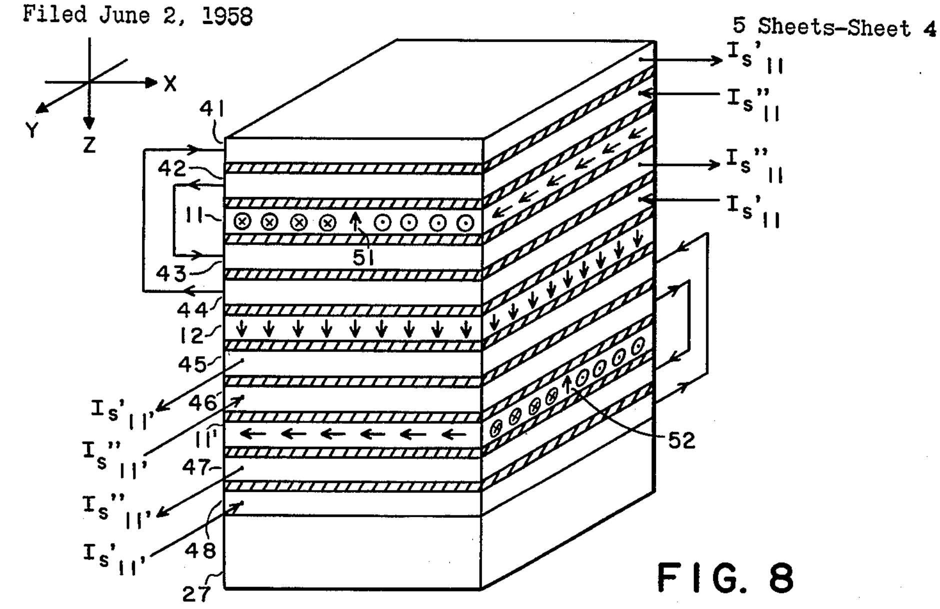
Fig. 8 illustrates apparatus for applying switching fields to the embodiment of Fig. 7.

Fig. 8 illustrates one embodiment of apparatus for applying respective switching fields to scanning media 11 and 11′ of the embodiment of the invention shown in Fig. 7, applicable reference numerals having been retained wherever possible. The technique illustrated herein follows closely that shown in Figs. 4 to 6, the drawing being confined to a section of the films actually in use in order to provide a better illustration of the principles employed. For the sake of clarity, the relative dimensions shown are not necessarily representative of those actually used. Additionally, such items as tapered areas, graded medium thickness, current distribution blocks or overlap of the conductive films have been purposely omitted.

A constant current $I_s{}'_{11}$ is applied to non-magnetic, conductive film 44 and traverses the latter in a direction parallel to the X-axis, as shown by the current vector. In lieu of a graded film thickness, the width of film 44 may vary in the direction of current flow, in a manner equivalent to that illustrated in Fig. 5. As shown in the drawing, one edge of film 44 is electrically connected to the corresponding edge of another non-magnetic, conductive film 41, current $I_s{}'_{11}$ traversing the latter in a direction opposite to that in film 44. The width of film 41 tapers in the same manner as that of film 44, so that the two films, if superposed, cover the same area. In view of the fact that the areas of films 41 and 44 respectively, are large compared to their thickness and distance from each other, the magnetic fields resulting from the flow of current $I_s{}'_{11}$ in respective films are parallel to the Y-axis and reinforce each other in the space between the films but cancel each other in the space beyond. Accordingly, current $I_s{}'_{11}$ will have no direct effect on storage medium 12 nor on scanning medium 11′. A time-varying current $I_s{}''_{11}$ is applied to a non-magnetic, conductive film 42 of uniform width and traverses the latter in a direction parallel to the X-axis. One edge of film 42 is electrically connected to the corresponding edge of non-magnetic, conductive film 43 of equal area, current $I_s{}''_{11}$ traversing the latter in the opposite direction. Similar to the case above, the magnetic fields are directed parallel to the Y-axis due to current flow in films 42 and 43 respectively, and reinforce each other in the space between the films while cancelling outside of that space. The combined effect on the thin-film scanning medium 11 of currents $I_s{}'_{11}$ and $I_s{}''_{11}$ is to produce a switching field parallel to the Y-axis which travels in a direction parallel to the X-axis with variations of $I_s{}''_{11}$. As may be seen from the drawing, the easy direction of magnetization of scanning medium 11, as indicated by the electron spin axis vectors, is parallel to the Y-axis. Accordingly, the application of a switching field in that direction produces an inter-domain wall 51 in scanning medium 11 which travels in a direction parallel to the X-axis. As illustrated in the drawing, this inter-domain wall is momentarily positioned centrally of scanning medium 11, its associated magnetic field being parallel to the Z-axis in an upward direction.

In similar fashion scanning medium 11′ is disposed centrally of two pairs of electrically connected, conductive, non-magnetic films 45, 48 and 46, 47 respectively, the first of these pairs having a tapering width in a direction parallel to the Y-axis. As before, constant current $I_s{}'_{11'}$ and time-varying current $I_s{}''_{11'}$, traverse the films comprising respective pairs in opposite directions parallel to the Y-axis to apply magnetic fields parallel to the X-axis which reinforce each other in the space between said pairs of films and cancel each other outside of said space. The resultant switching field is applied in a direction parallel to the X-axis to scanning medium 11′, the easy direction of magnetization of the latter also being parallel to the X-axis. As illustrated in the drawing, an inter-domain wall 52 is momentarily positioned centrally of scanning medium 11′, the latter wall moving in a direction parallel to the Y-axis with variations of $I_s{}''_{11'}$. The magnetic field associated with the inter-domain wall in scanning medium 11′ is parallel to the Z-axis and in an upward direction. High coercive force storage medium 12 is seen to have an easy direction of magnetization parallel to the Z-axis, the electron spin axes being oriented in a downward direction. As explained in connection with Fig. 7, the insulating films which separate the storage medium from the scanning media are deposited in a thickness sufficient to obtain the required spacing which will prevent the magnetic field associated with one of said inter-domain walls from reorienting the storage medium. At the point of intersection of the two magnetic fields, however, the latter reinforce each other so that the resultant scanning field in the form of a scanning probe, is strong enough to reorient the electron spin axes of a limited area of the storage medium to form a storage cell. It will be understood that additional storage matrices may be positioned on the same supporting substrate 27 by the successive deposition of the films shown herein.

The operation of the apparatus described above follows closely that described in connection with Figs. 4 to 6. Either an inhibiting field parallel to the Z-axis or velocity modulation of the scanning field is used to control the effectiveness of the scanning probe in order to reorient only selected areas of the matrix in accordance with the data to be stored. Accordingly, the input signal may be used to vary the inhibiting field winding current, as shown in Fig. 3, while $I_s{}''_{11}$ and $I_s{}''_{11'}$ are varied slowly to propagate the resultant scanning probe at a rate sufficiently low to cause reorientations in the absence of an inhibiting field. Alternatively, the input signal may vary $I_s{}''_{11}$ and $I_s{}''_{11'}$ to achieve the same effect by velocity modulating the propagation of the scanning probe. Data is stored in columns and rows as in a conventional storage matrix, the intersection of a column and a row defining one of the aforesaid storage cells. Data may be read out of storage by measuring the velocity modulation of a non-reorienting scanning probe, as described hereinabove. Additionally, a field parallel to the Z-axis is used when it is desired to erase the data stored in the matrix.

Apart from the alternatives of controlling the effect of the scanning probe by means of an inhibiting field or by velocity modulation, many variations of the embodiment of Fig. 8 are possible. Thus, the number and shape of the non-magnetic, conductive films associated with each scanning medium may vary depending on the particular switching field required. Nor need the two scanning media be positioned on opposite sides of the storage medium, but both may be disposed to one side thereof. Where it is desired to reorient an entire matrix column or row simultaneously, the inhibiting field may be reversed to apply a supplemental field to the entire matrix in a direction parallel to the Z-axis. While the strength of the supplemental field in this case is kept below the level where it alone has an effect on the storage medium, the additional field applied by an inter-domain wall in one of the scanning media reinforces the supplemental field to bring about the reorientation of an entire row or column. The size of the storage cells in the present invention is, of course, not fixed as in the case of the conventional storage matrix and may be increased arbitrarily in order to store the minimum amount of energy required for reliable readout. One technique for achieving this result is to vary the amplitude of one of currents $I_s''_{11}$ or $I_s''_{11'}$ about a fixed value in order to oscillate the corresponding wall and its associated magnetic field about a fixed point. If the other wall remains stationary during this interval, the resultant storage cell will be roughly rectangular in the direction of wall oscillation and will cover a larger area.

Since any desired configuration may be represented in the storage matrix by a proper combination of discrete storage cells, it becomes desirable under certain conditions that data stored therein be capable of being observed visually. Figs. 9 and 10 illustrate one method of visual data observation which employs the well known Faraday magneto-optic effect. A condensing lens system 61 receives light from a light source 60, said incident light having vector components uniformly distributed in a 360° sector normal to the beam, as shown at 62. A polarizer 63 having a polarizing angle $\theta$ relative to a reference line is placed in the path of the light beam. As seen at 65, light waves polarized at an angle $\theta$ only are permitted to pass the polarizer. Thin-film storage medium 12 is stationed in the path of the polarized light beam. If the spin axis orientation of the storage cells encountered by the incident beam is as shown in the drawing, the polarization of the light beam is rotated by an increment $+\Delta\theta$, as shown at 66. If, on the other hand, the magnetization of the encountered portion of the medium is reversed, the angle of polarization of the light transmitted through said reversed portion is changed by an increment $-\Delta\theta$.

The applicable equation is $$\Delta\theta = T \cdot K \cdot \cos\phi$$

where $\Delta\theta$=Rotational increment of the angle of polarization.
$T$=Thickness of medium along light path.
$K$=Specific rotation of medium per unit thickness.
$\phi$=Angle between direction of light travel and direction of magnetization of medium.

Figures 9A, 9B:
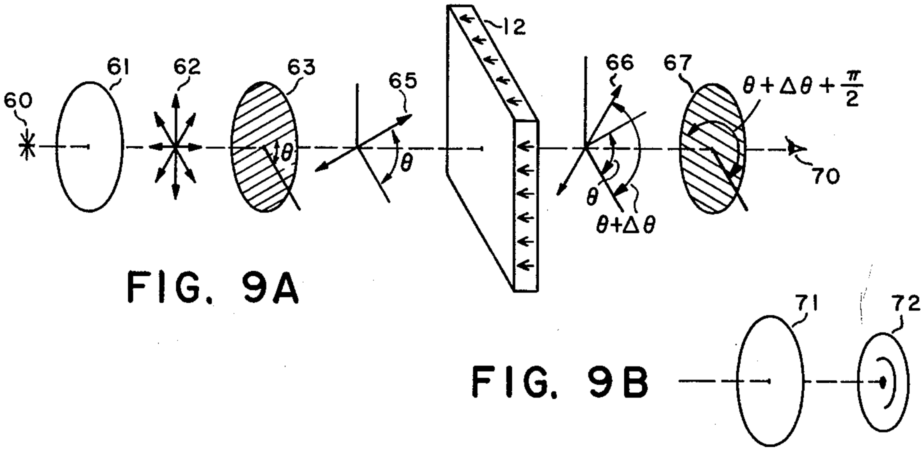
Fig. 9 illustrates one embodiment of display apparatus for optically reading out stored data, or for visual observation.

Since $\phi$ in the instant case is 0, cos $\phi$ is unity herein. An analyzer 67, having a polarizing angle $$\theta + \Delta\theta + \frac{\pi}{2}$$

blocks substantially all light polarized at an angle $\theta+\Delta\theta$ while passing some of the light having an angle of polarization $\theta-\Delta\theta$. The intensity of the light passed by the analyzer is shown in Fig. 10 as a function of angle $\alpha$, i.e. the angle between respective polarizing angles of the polarizer and of the analyzer. It will be seen that the intensity of the beam which passes the analyzer varies as the $\cos^2$ function of $\alpha$, value A being the intensity of the light passed herein. Value B represents the intensity of the light when the angle is $\theta-\Delta\theta$, which is passed due to imperfections in the analyzer. This value is low enough to be without practical significance. At station 70 an observer is able to see the configuration composed of discrete storage cells which is represented on the storage medium. If it is desired to use optical readout of individual storage cells in order to obtain an electrical output signal, as shown in Fig. 9B, lens 61 spot-focusses the light beam in a spot on the storage medium. Controlled relative motion of lens 61 and light source 60 provides spot scanning of the storage medium. A lens 71 collects the light from analyzer 67 and transmits it to a photoelectric cell 72. The latter provides an electrical signal in response to light fluctuations resulting from differently magnetized storage cells of the storage medium encountered by the scanning beam.

Since storage medium 12 in Fig. 8 cannot be conveniently separated from the films disposed on either side thereof, the successful operation of the embodiment of Fig. 9 requires that the films on either side of the storage medium, which may vary in thickness between 100 and 10,000 A., as well as the medium itself, be transparent to the incident beam, additionally, the presence of inter-domain walls in the scanning media may add a rotational increment to the beam. Accordingly, it is important that no inter-domain walls reside in the scanning media during the period of light beam scanning. In an alternative embodiment which is illustrated in Fig. 11, both scanning media and their associated films are positioned on the same side of the storage medium and the familiar Kerr magneto-optic effect is employed. Applicable reference numerals have been retained. In this embodiment the scanning polarized light beam arrives at the surface of the storage medium at an angle $\phi$ and is reflected off the latter. The spin axis orientation of the particular storage cell scanned determines the rotational increment of the angle of polarization. As in the embodiment of Fig. 9, the relative motion of lens 61 and light source 60 causes the beam to scan the entire surface of the storage medium, light fluctuations again being detected by photocell 72. It will be understood that the instant embodiment of the invention is susceptible of visual observation by incorporating the modifications discussed in connection with Fig. 9A.

The techniques hereinabove discussed are not confined to the processing of digital data. If it is desired to store data corresponding to an analog quantity, the representative analog signal may be readily transformed by the well known expedient of pulse width modulation into a signal capable of being used by the apparatus described above. If the effectiveness of the scan is controlled by means of an inhibiting field, the pulse width modulated signal which is representative of the analog quantity is applied to the inhibiting winding. Where velocity modulation is employed such as in Fig. 8, the signal is used to modulate currents $I_s''_{11}$ and $I_s''_{11'}$. In either case, the resultant static domains of the storage medium vary in size, such variation being representative of variations in the magnitude of the analog quantity. Data readout is readily carried out by the velocity modulation scanning method described above, whereby the size of the aforesaid domains is detected.

The storage techniques described and illustrated hereinabove, permit a data storage density per unit matrix surface area, both of digital as well as of analog data, far in excess of that possible with present day equipment. These high data storage densities are achieved at no sacrifice in access time. On the contrary, the scanning probe can be made to move with almost arbitrarily great velocity, such velocity being limited by domain rotation for the complete reversal of the film at approximately $10^{-9}$ seconds, rather than by any inherent limitations in the scanning process.

Having thus described the invention, it will be apparent that numerous modifications and departures, as explained above, may now be made by those skilled in the art, all of which fall within the scope contemplated by the invention. Consequently, the invention herein disclosed is to be construed as limited only by the spirit and scope of the appended claims.

What is claimed is:

1. Data processing apparatus comprising first and second magnetic scanning media, means for establishing inter-domain walls in respective scanning media, each of said walls having an associated magnetic field, means for propagating said walls across respective scanning media in mutually angularly disposed directions, said scanning media being positioned relative to each other to cause the associated magnetic fields of simultaneously existing walls to intersect, said fields reinforcing each other in the area of intersection to form a scanning probe, and a storage medium disposed within the effective range of said scanning probe.

2. Data processing apparatus comprising first and second scanning media having respective easy directions of magnetization substantially parallel to first and second axes, said first and second axes being mutually perpendicular, means for applying switching fields to said scanning media in the direction of said first and second axes respectively, each application of a switching field establishing an inter-domain wall in the scanning medium to which it is applied and propagating it in a direction normal to the easy direction of magnetization thereof, a magnetic field associated with each of said walls having a direction normal to said first and second axes, said scanning media being positioned relative to each other to cause the magnetic fields of walls simultaneously existing in respective media to intersect, said magnetic fields reinforcing each other in the area of intersection to form a resultant scanning probe, a storage medium disposed within the effective range of said scanning probe, and means for controlling the effect of said probe on said storage medium in accordance with the data to be stored.

3. Data processing apparatus comprising a high coercive force storage medium having an easy direction of magnetization substantially parallel to a first axis normal to one surface thereof, a first scanning medium disposed parallel to said surface and having an easy direction of magnetization substantially parallel to a second axis normal to said first axis, means for repetitively applying a switching field to said first scanning medium in a direction parallel to said second axis, each application of said switching field establishing an inter-domain wall in said first scanning medium and propagating it in a direction parallel to a third axis normal to said first and second axes, a second scanning medium disposed parallel to said surface and having an easy direction of magnetization substantially parallel to said third axis, means for repetitively applying a switching field to said second scanning medium in a direction parallel to said third axis, each application of said last recited switching field establishing an inter-domain wall in said second scanning medium and propagating it in a direction parallel to said second axis, each of said inter-domain walls having a magnetic field associated therewith which is parallel to said first axis, said scanning media being positioned relative to each other such that the magnetic fields associated with the walls simultaneously existing in respective media intersect, said magnetic fields reinforcing each other to form a resultant scanning probe in the area of intersection, said storage medium being disposed within the effective range of said scanning probe but beyond the effective range of individual associated magnetic fields, and means for controlling the effect of said scanning probe on said storage medium.

4. The apparatus of claim 3 and further comprising readout means adapted to read out the stored data by measuring the velocity modulation of a non-reorienting scan.

5. The apparatus of claim 3 wherein each of said media comprises a thin film, said scanning media being disposed to one side of said storage medium and parallel thereto, said media being separated from each other by films of insulating material.

6. The apparatus of claim 3 wherein each of said media comprises a thin film, said scanning media being disposed on both sides of said storage medium and parallel thereto, said media being separated from each other by films of insulating material.

7. The apparatus of claim 6 and further comprising means for applying a supplemental field to said storage medium in the direction of said associated magnetic fields, said supplemental field being small enough to be without effect on said storage medium but being adapted to reorient the latter in cooperation with one of said associated magnetic fields.

8. Data processing apparatus comprising a thin-film high coercive force storage medium having an easy direction of magnetization substantially parallel to a first axis normal to said film and exhibiting a square loop behavior in said direction, first and second thin-film scanning media respectively disposed parallel to said storage medium and a predetermined distance therefrom, said first scanning medium having an easy direction of magnetization substantially parallel to a second axis normal to said first axis and exhibiting a square loop behavior in said last recited direction, said second scanning medium having an easy direction of magnetization substantially parallel to a third axis normal to both said first and second axes and exhibiting a square loop behavior in said last recited direction, a first pair of insulated, non-magnetic conductive films of equal area disposed equidistantly on opposite sides of said first scanning medium and parallel thereto, the width of the films comprising said first pair tapering along a film dimension parallel to said third axis, said films having an edge parallel to said second axis connected together electrically to form a first conductive path parallel to said third axis, means for applying a current to said first conductive path, a second pair of insulated, non-magnetic conductive films of equal area disposed equidistantly on opposite sides of said first scanning medium and parallel thereto, the films comprising said second pair having an edge parallel to said second axis connected together to form a second conductive path parallel to said third axis, means for applying a current to said second conductive path in a direction opposite to that of the current in said first path, the switching field resulting from the flow of respective first and second currents establishing an inter-domain wall in said first scanning medium, said wall having a magnetic field associated therewith in a direction parallel to said first axis, data input-responsive means for time-varying the magnitude of said second current to propagate said wall across said first scanning medium in a direction parallel to said third axis, a third pair of insulated, non-magnetic conductive films of equal area disposed equidistantly on opposite sides of said second scanning medium, the width of the films comprising said third pair tapering along a film dimension parallel to said second axis, said films having an edge parallel to said third axis connected together electrically to form a third conductive path parallel to said second axis, means for applying a current to said third conductive path, a fourth pair of insulated, non-magnetic conductive films of equal area disposed equidistantly on opposite sides of said second scanning medium and parallel thereto, the films comprising said fourth pair having an edge parallel to said third axis connected together electrically to form a fourth conductive path parallel to said second axis, means for applying a current to said fourth conductive path in a direction opposite to that of the current in said third path, the switching field resulting from the flow of respective third and fourth currents establishing an inter-domain wall in said second scanning medium, said last recited wall having a magnetic field associated therewith in a direction parallel to said first axis, data input-responsive means for time-varying the magnitude of said fourth current to propagate said wall across said second scanning medium in a direction parallel to said second axis, said scanning media being disposed relative to each other such that the associated magnetic fields of simultaneously existing walls intersect, said fields reinforcing each other in the area of intersection to form a resultant scanning probe adapted to reorient a limited area of said storage medium, said predetermined distances being sufficiently large to prevent reorientation by one associated magnetic field alone, respective input data-responsive means cooperating to control the movement of said scanning probe.

9. The apparatus of claim 8 and further comprising means for applying a magnetic field to said storage medium in a direction parallel to said first axis.

10. The apparatus of claim 9 and further comprising voltage-sensitive data readout means, said last recited means being responsive to velocity variations of said scanning probe during a non-reorienting scan, said velocity variations being indicative of the existence of reoriented areas.

11. Data processing apparatus comprising a thin-film high coercive force storage medium having an easy direction of magnetization substantially parallel to a first axis normal to said film and exhibiting a square loop behavior in said direction, first and second thin-film scanning media respectively disposed parallel to said storage medium and a predetermined distance therefrom, said first scanning medium having an easy direction of magnetization substantially parallel to a second axis normal to said first axis and exhibiting a square loop behavior in said last recited direction, said second scanning medium having an easy direction of magnetization substantially parallel to a third axis normal to both said first and second axes and exhibiting a square loop behavior in said last recited direction, a first pair of non-magnetic conductive films of equal area disposed equidistantly on opposite sides of said first scanning medium and parallel thereto, the cross-sectional area of the films of said first pair varying along a film dimension parallel to said third axis, means for applying currents in opposite directions parallel to said third axis to respective conductive films of said first pair, a second pair of non-magnetic conductive films of equal area disposed equidistantly on opposite sides of said first scanning medium and parallel thereto, means for applying currents of opposite direction to those applied to said first pair to respective conductive films of said second pair, means for time-varying the magnitude of said last recited currents, a third pair of non-magnetic conductive films of equal area disposed equidistantly on opposite sides of said second scanning medium and parallel thereto, the cross-sectional area of the films of said third pair varying along a film dimension parallel to said second axis, means for applying currents in opposite directions parallel to said second axis to respective conductive films of said third pair, a fourth pair of non-magnetic, conductive films of equal area disposed equidistantly on opposite sides of said first scanning medium and parallel thereto, means for applying currents of opposite direction to those applied to said third pair to respective conductive films of said fourth pair, means for time-varying the magnitude of said last-recited currents, the application of said currents establishing a magnetic scanning probe adapted to reorient selected areas of said storage medium.

12. The apparatus of claim 11 wherein said first and second scanning media and their associated conductive films are disposed on opposite sides of said storage medium, all of said films being superposed on a supporting substrate to form a data track, and further comprising means for focussing a beam of polarized light having a predetermined rotational angle on said storage medium, said data track being substantially transparent to said beam, means for scanning said storage medium with said polarized beam, said predetermined rotational beam angle being increased or decreased by a fixed amount to assume one of two new rotational angles depending on the orientation of the storage medium area scanned, analyzing means positioned to receive the beam passing through said storage medium, said analyzing means passing a beam having one of said new rotational angles while substantially blocking a beam having the other rotational angle, a collecting lens positioned to receive said beam from said analyzer, and a photoelectric cell adapted to provide electrical output signals in response to light received from said collecting lens.

13. The apparatus of claim 11 wherein said first and second scanning media and their associated conductive films are disposed on opposite sides of said storage medium, all of said films being superposed on a supporting substrate to form a data track, and further comprising means for illuminating said storage medium with a beam of polarized light having a predetermined rotational angle, said predetermined rotational beam angle being increased or decreased by a fixed amount to assume one of two new rotational angles depending on the orientation of the storage medium area encountered, analyzing means positioned to receive the beam passing through said storage medium, said analyzing means passing a beam having one of said new rotational angles while substantially blocking a beam having the other rotational angle, the light output of said analyzing means affording a visual observation of the configuration of said reoriented areas of said storage medium.

14. The apparatus of claim 11 wherein said first and second scanning media and their associated conductive films are disposed on one side of said storage medium while the other side thereof remains exposed, means for focussing a beam of polarized light having a predetermined rotational angle on said other side of said storage medium, said beam impinging on said other side at an angle less than 90°, means for scanning said other side with said polarized beam, said predetermined rotational beam angle being increased or decreased by a fixed amount to assume one of two new rotational angles depending on the orientation of the area of said other side being scanned, analyzing means positioned to receive the beam reflected off said other side, said analyzing means passing a beam having one of said new rotational angles while substantially blocking a beam having the other rotational angle, a collecting lens positioned to receive said beam from said analyzer, and a photoelectric cell adapted to provide electrical output signals in response to light received from said collecting lens.

15. The apparatus of claim 11 wherein said first and second scanning media and their associated conductive films are disposed on one side of said storage medium while the other side thereof remains exposed, means for illuminating said other side with a beam of polarized light having a predetermined rotational angle, said beam impinging on said other side at an angle less than 90°, said predetermined rotational beam angle being increased or decreased by a fixed amount to assume one of two new rotational angles depending on the orientation of the area of said other side being encountered, analyzing means positioned to receive the beam reflected off said other side, said analyzing means passing a beam having one of said new rotational angles while substantially blocking a beam having the other rotational angle, the light output of said analyzing means affording a visual observation of the configuration of said reoriented areas of said other side.

References Cited in the file of this patent

Fowler et al.: Physical Review, vol. 94, pp. 52–56, Apr. 1, 1954.

UNITED STATES PATENT OFFICE

CERTIFICATE OF CORRECTION

Patent No. 2,984,825 May 16, 1961

Harrison W. Fuller et al.

It is hereby certified that error appears in the above numbered patent requiring correction and that the said Letters Patent should read as corrected below.

Column 6, line 25, for "its", second occurrence, read -- the --; line 56, for "end" read -- send --; column 7, line 4, after "each" insert -- other --.

Signed and sealed this 31st day of October 1961.

(SEAL)
Attest:

ERNEST W. SWIDER
Attesting Officer

DAVID L. LADD
Commissioner of Patents

USCOMM-DC